United States Patent [19]

Fritzer

[11] Patent Number: 5,164,753
[45] Date of Patent: Nov. 17, 1992

[54] APPARATUS AND METHOD FOR MULTIPLE PICTURE PHOTOGRAPHY

[76] Inventor: Robby Fritzer, 11679 Via Paloma, El Cahon, Calif. 92019

[21] Appl. No.: 727,579

[22] Filed: Jul. 9, 1991

[51] Int. Cl.⁵ .............................................. G03B 1/00
[52] U.S. Cl. ................................... 354/120; 354/109
[58] Field of Search ....................... 354/120, 109, 110

[56] References Cited

U.S. PATENT DOCUMENTS 5,019,844  5/1991  Fritzer ................................ 354/120

Primary Examiner—Richard A. Wintercorn
Assistant Examiner—Howard B. Blankenship
Attorney, Agent, or Firm—Spensley, Horn, Jubas & Lubitz

[57] ABSTRACT

An improved camera, and a method of using it, so that a user of the inventive camera may be photographed, together with other objects to be photographed, in a simultaneous manner, without the need for a time delay. The present invention comprises a camera that includes a front primary lens to focus an image of a primary object to be photographed onto a frame of film having a photosensitive emulsion coating a transparent film base. A rear secondary lens focusses an image of the photographer onto a portion of the same film frame through the transparent film base, such that the image exposes the photosensitive emulsion on the front side of the film. A light shield is provided within the camera body to block light from the front primary lens from exposing the portion of the film frame on which light from the rear secondary lens is focussed.

In use, the photographer focusses the front primary lens on the primary object of the picture, and then positions the camera at approximately arms' length while maintaining the primary object in focus. The photographer then aligns his or her face relative to a rear-mounted mirror so that when the user sees his or her image in the rear mirror, the user's image is properly aligned with the rear secondary lens. Upon obtaining this orientation, the shutter release of the inventive camera is activated to expose both the front and rear images simultaneously on the same film frame.

15 Claims, 1 Drawing Sheet

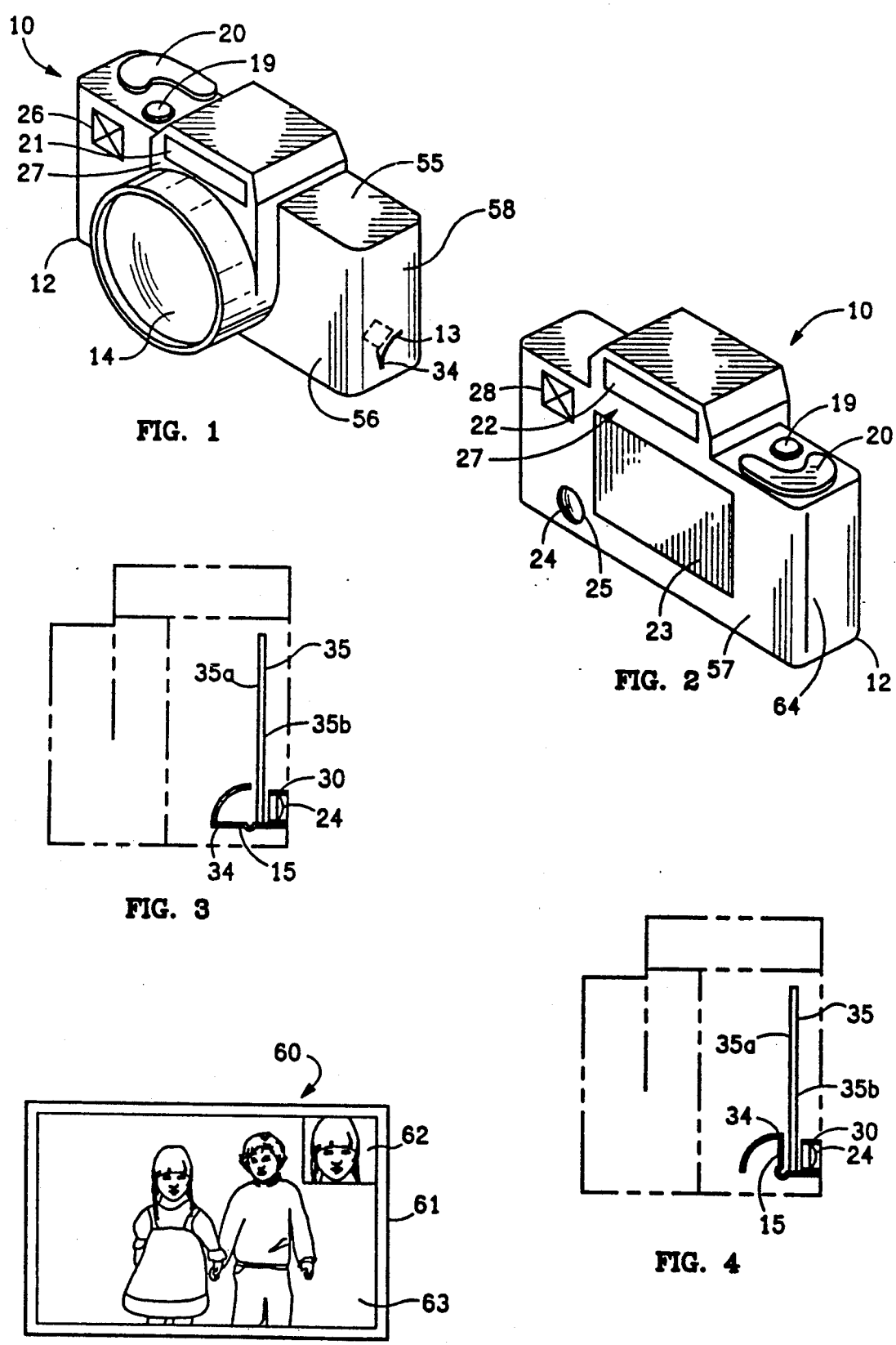

APPARATUS AND METHOD FOR MULTIPLE PICTURE PHOTOGRAPHY

BACKGROUND OF THE INVENTION

1. Field of the Invention

This invention relates to photographic cameras, and in particular to an apparatus and method for enabling multiple images to be photographed onto a single picture frame.

2. Related Art

Cameras have been employed for many years, and are all of a generally similar design. In using such cameras, however, it has been difficult, if not impossible, for the operator of the camera to be included in the photograph. Elaborate and expensive time delay devices have been employed for automatically activating a camera lens shutter after a time delay. With such cameras, the operator activates a shutter release, then steps in front of the camera lens so that he or she can be photographed after the time-delay interval expires.

Such an approach is not entirely satisfactory for all situations, and it is often times awkward to perform such an operation. Also, time-delay photography does not lend itself to taking a series of photographs while including the camera operator in the photographs.

Therefore, it would be highly desirable to have a new and improved camera design which enables a person taking a photographic picture to be included in the photograph without the use of elaborate time delay shutter devices or the like.

Once such camera that overcomes the problems of the prior art is disclosed in U.S. Pat. No. 5,019,844, in the name of the present inventor. That patent describes a camera construction and method of using same, where the camera includes a front primary lens to focus a primary image of an object to be photographed onto a film frame. A rear secondary lens and a reversely bent light path arrangement focusses an image of the user onto a portion of the same film frame. A rear external mirror enables the user to align properly his or her image relative to the rear secondary lens.

Although the design shown in U.S. Pat. No. 5,019,844 solves the basic problems of the prior art, it does require a dual mirror system that creates a bent light path for directing light from the rear secondary lens to the front of the film frame. This may require that the camera have a taller body in order to accommodate the "on/off control assembly" disposed within the hollow interior of the camera body. The on/off assembly is also itself rather bulky, which inhibits its use in compact 35 mm cameras for the type currently most popular.

Therefore, it would be desirable to have a camera of similar function constructed and operated in a manner which permits a more compact camera construction while still enabling a user to determine selectively whether or not he or she would be included in the photograph to be taken, along with the primary object to be photographed. The present invention provides such a camera and a method for using it.

SUMMARY OF THE INVENTION

The present invention provides an improved camera, and a method of using it, so that a user of the inventive camera may be photographed, together with other objects to be photographed, in a simultaneous manner, without the need for a time delay. The improved camera utilizes conventional film and can be manufactured inexpensively.

Briefly, the present invention comprises a camera that includes a front primary lens to focus an image of a primary object to be photographed onto a frame of film having a photosensitive emulsion coating a transparent film base. A rear secondary lens focusses an image of the photographer onto a portion of the same film frame through the transparent film base, such that the image exposes the photosensitive emulsion on the front side of the film. A simple shutter is provided for the rear secondary lens to prevent premature exposure of the film through such lens. In addition, a light shield is provided within the camera body to block light from the front primary lens from exposing the portion of the film frame on which light from the rear secondary lens is focussed.

In use, the photographer focusses the front primary lens on the primary object of the picture, and then positions the camera at approximately arms' length while maintaining the primary object in focus. The photographer then aligns his or her face relative to a rear-mounted mirror so that when the user sees his or her image in the rear mirror, the user's image is properly aligned with the rear secondary lens. Upon obtaining this orientation, the shutter release of the inventive camera is activated to expose both the front and rear images simultaneously on the same film frame.

In an alternative use of the inventive camera, the photographer focusses the front primary lens on the primary object of the picture, and positions the light shield in place to shield a portion of the film frame from light from such primary object. The shutter release of the camera is activated to expose the unshielded portion of the film frame. Thereafter, the user positions the camera at approximately arms' length and aligns his or her face relative to the rear mirror so that when the user sees his or her image in the rear mirror, the user's image is properly aligned with the rear secondary lens. The shutter release for the rear secondary lens is then activated to expose the rear image through the transparent film base of the same frame of film used to expose the primary object through the front primary lens. As an alternative to capturing his or her image on the film, the user may direct the rear secondary lens at any desired object.

The inventive camera and method of using it permits a person using such a camera to selectively include his or her image in the same film frame as the photograph he or she may be taking, without utilizing time delays.

The details of one embodiment of the present invention are set forth below. Once the details of the invention are known, numerous additional innovations and changes will become obvious to one skilled in the art.

DESCRIPTION OF THE DRAWINGS

FIG. 1 is a front and left side pictorial view of a camera constructed according to the present invention.

FIG. 2 is a rear and right side pictorial view of the camera shown in FIG. 1.

FIG. 3 is a diagrammatic left side view of the internal construction of the camera shown in FIG. 1 showing a light shield in a non-light blocking position.

FIG. 4 is a diagrammatic left side view of the internal construction of the camera shown in FIG. 1 showing a light shield in a light blocking position.

FIG. 5 is a face view of a resulting photograph taken by the camera of FIG. 1.

Like reference numbers in the various figures refer to like elements.

DETAILED DESCRIPTION OF THE INVENTION

Throughout this description, the preferred embodiment and examples shown should be considered as exemplars, rather than limitations on the apparatus and method of the present invention.

FIGS. 1-4 show a camera constructed according to the present invention. The camera 10 may be used to take a picture of a primary object, while at the same time, or at a subsequent time, taking a picture of the photographer or any desired secondary object. While the camera 10 shown and described herein is for a still camera, the invention may also be applied to motion picture cameras or the like.

The camera 10 generally comprises a box-like hollow camera body 12. The camera body 12 may be, for example, of unitary construction composed of a suitable material (such as a thermoplastic material), and includes a top portion 55, a front wall portion 56, a rear wall portion 57, a base portion 58, and a pair of side wall portions 59 and 64 that interconnect the other portions 55, 56, 57, and 58 of the camera body 12 to form an essentially light-tight structure. The camera 10 further includes a shutter release control button 19 on the top wall 55, and a film advance handle 20 exposed on the top portion 55 near the release button 19, for convenient activation by a user.

The front primary lens 14 of the camera 10 projects an image of a primary object onto a frame 35 of a conventional photosensitive film, such as 35 mm film. Conventional 35 mm film has a transparent substrate or base 35b, upon which photosensitive emulsion is coated. The photosensitive emulsion is on the front side 35a of the film 35, such that light from the front primary lens 14 impinges on the film emulsion directly, without traversing through the transparent film base.

The camera 10 further includes a rear secondary lens 24 recessed within an aperture or opening 25 in the camera body 12. In the preferred embodiment, the aperture 25 is disposed adjacent to the lower left corner of the back of the camera body 12. However, the rear secondary lens 24 and aperture 25 may be positioned anywhere on the camera body 12 depending upon the portion of the film on which the secondary image is to be exposed. A secondary shutter 30 is positioned between the rear secondary lens 24 and the film frame 35. The secondary shutter 30 may be of conventional leaf-type construction, conventional moving-curtain type construction, or an electronic shutter including any of several known materials that have variable transparencies in the presence or absence of an electric field or an external force (such as liquid crystal displays, PLZT materials, or any other electric, ceramic, or electro-optical material whose optical properties can be changed by an electric field or by being placed in tension or compression).

As explained in more detail below, the rear secondary lens 24 focusses a secondary object, such as the face of the user, through the transparent film base 35b onto the front side emulsion 35a of the same film frame 35 used to record the primary object received from the front primary lens 14. To properly encompass the photographer's face or other close objects, the rear secondary lens 24 is preferably a wide-angle lens. Further, since the rear secondary lens 24 is projecting an image onto the film 35 through the back 35b to be viewed from the front 35a (after development), the rear secondary lens 24 may include a corrective lens or mirror so that the secondary image focussed on the film 35 is inverted top to bottom, but not left to right.

In the preferred embodiment, the camera body 12 also includes an arc-shaped slot 13 on the side wall 58 of the camera through which access may be gained to a light-shield assembly 15. As best illustrated in FIGS. 1 and 3, the light shield assembly 15 is pivotably disposed within the hollow interior of the camera body 12. The light shield assembly 15 is moved manually upwardly and downwardly through an arc into and out of the plane of focus of the front primary lens 14. For the purpose of assuring the proper activation of the inventive self-photographing feature, the light shield assembly 15 includes a control handle or sideways projecting member 34 that projects through the slot 13. The control handle 34 enables a user to pivot the light shield assembly 15 from a non-light blocking position (shown in FIG. 3) into a light blocking position (shown in FIG. 4), and vice versa. If desired, other light shield assemblies configurations could be used, including an assembly that slides from the side, bottom, or top of the film frame 35 into a light blocking position.

Any of several means, such as a detent, may be used to releasably retain the light shield assembly 15 in either the blocking position or non-blocking position. If desired, the light shield assembly 15 can be held in the blocking position by a simple latch and spring mechanism (not shown). Activation of the shutter release control button 19 releases the light shield assembly, thus automatically moving it from the blocking position to the non-blocking position after each self-photograph in order to put the camera back into its normal configuration.

The light blocking shield of the light shield assembly 15 is shown as being generally rectangular shaped. However, it can be any desired shape, including oval or round. The size of the light blocking assembly is preferably slightly larger than the size of the image projected by the rear secondary lens 24 onto the emulsion side 35a of the film through the base 35b of the film frame 35. The light shield assembly 15 is preferably juxtaposed close (e.g., 3 mm or less) to the front surface 35a of the film frame 35 when in its light-blocking position, in order to prevent light from the front primary lens 14 from "bleeding" into the image area exposed by the rear secondary lens 24, and to prevent light from the rear secondary lens 24 from reflecting off the interior structures of the camera back onto the front side 35a of the film frame 35.

The camera 10 also preferably includes a centrally disposed, rearward facing mirror 23 disposed on the rear side of the camera 10 directly opposite the front primary lens 14. The mirror 23 assists the user in properly aligning his or her face relative to the rear secondary lens 24. In the preferred embodiment, the rear secondary lens 24 is positioned adjacent to the mirror 23 so that the rear secondary lens 24 will receive a real image of the face of the photographer when the photographer's facial image is aligned with the mirror 23.

For the purpose of assisting a user of the camera 10 and properly composing a picture, the camera 10 also preferably includes an oversized "high eye-relief" viewfinder 27 having a front portion 21 centrally disposed above the front primary lens 14 on the top portion 55 of the camera 10. Such high eye-relief viewfinders are known in the prior art. The oversized viewfinder 27 further includes a rear viewing portion 22 disposed on the central upper rear portion 57 of the camera 10. Optionally, the oversized viewfinder 27 may be designed to fit over or adjacent to a standard viewfinder, so that the standard view finder may be used when the self-photography feature of the camera 10 is not in use.

In the preferred embodiment, the oversized viewfinder 27 includes a visual indicator, such as a small square, positioned within the field of view of the viewfinder 27 to indicate the approximate position in the film frame 35 where the rear secondary object will be imaged.

In order to provide a proper amount of lighting for photography purposes, the camera 10 may also include a pair of front and rear flash units 26, 28, which are respectively disposed on the front wall 56 and rear wall 57 of the camera 10.

To activate the self-photographing feature of the camera 10, the user moves the light shield assembly 15 manually to the light blocking position. To deactivate the self-photographing feature, the user moves the light shield assembly 15 manually to the non-blocking position. The action of moving the light shield assembly 15 into the blocking position or into the blocking position also can be used to cock the secondary shutter 30 by means of a mechanical or electrical coupling of the secondary shutter 30 to the light shield assembly 15. Alternatively, the secondary shutter 30 can be cocked when the film 35 is advanced.

As described above, the rear secondary lens 24 is positioned with respect to the film frame 35 such that light passing through the lens 24 will impinge upon the back side of the film 35. Light from the rear secondary lens 24 passes through the transparent base 35b comprising the back side of the film 35, and impinges on the photosensitive emulsion from the rear. (It is believed that some "date-stamping" cameras use, for example, light emitting diodes to expose a date onto an edge of a film frame through the transparent film base. However, the prior art does not disclose using a rearward facing lens to expose the image of a photographer or other object onto a selected area of the film emulsion through the transparent film base.)

When the self photography feature of the camera 10 is activated by a user manually moving the control handle 34 to the light blocking position of the light shield assembly 15, the user's image is focussed on the film frame 35 through the rear secondary lens 24 upon opening of the shutter 30 positioned between the rear secondary lens 24 and the film frame 35. The light shield assembly 15 partially blocks the primary image received by the front primary lens 14 from being projected onto the entire film area, so that only the image received by the rear secondary lens 24 is projected through the film base onto the area of the film frame 35 covered by the light shield assembly 15.

When the user reverses the above process by moving the control handle 34 downward through the arc of the slot 13, the light shield assembly 15 pivots out of its light blocking position to its non-blocking position. (This occurs automatically after a self-photographic exposure where the light shield assembly 15 is released from its light blocking position and a spring return mechanism is provided to automatically return the assembly to its non-blocking position). The object image received by the front primary lens 14 may then be projected onto the entire film frame area in a conventional manner, without taking a picture of the user on the same film frame.

Considering now the photograph 60 shown in FIG. 5, the photograph 60 includes a photograph area 61 that is divided into a primary image area 63 and a secondary image area 62. The secondary image area 62 is located in the upper left corner of the photograph 60 (after development; with respect to the film frame 35 in the camera 10, as viewed from the front, the secondary image area 62 is in the lower right corner) and includes approximately 11% of the total photographed area 61 in the preferred embodiment. The remaining portion of the photographed area 61 (or approximately 89%) includes the primary image area 63. While the preferred ratio between the two image areas is 11:89, it should be understood that other ratios could be chosen.

While the lens 24 shown in the illustrated embodiment is a refractive lens, any means may be used that focusses light from an object plane onto an image plane, including a reflective imaging system or a microchannel imaging system.

In an alternative embodiment of the invention, the secondary shutter 30 is not tripped by activation of the primary shutter when the shutter release control button 19 is activated. Rather, the light-shield assembly 15 is moved into its blocking position, and a primary image is exposed through the front lens 14 onto the primary image area 63 of a film frame 35. Thereafter, without advancing the film frame 35, pressing the shutter release button 19 a second time activates the secondary shutter 30 and permits a secondary image to be recorded through the rear lens 24 onto the secondary image area 62 of the film frame 35. This sequential imaging mode of operation permits a photographer to view the primary object to be photographed through the viewfinder 27 without having to be concerned about aligning his or her image with respect to the secondary lens 24 while keeping the primary object 27 properly framed within the viewfinder 27. This mode of operation also permits a photographer, for example, to photograph a primary object, such as a scenic view, and thereafter to use the rear secondary lens 24 to expose a picture of the photographer and/or other persons or objects onto the same film frame 35.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

I claim:

1. In a camera construction, an arrangement comprising:
   a. a forwardly directed front lens means for focussing a primary image of a primary object to be photographed onto a frame area of a film having a photosensitive emulsion coated on a transparent base material;
   b. a rearwardly directed rear lens means for focussing a secondary image of a secondary object to be photographed onto a different portion of the same frame area of the film, through the transparent base of the film;
   c. shutter release means for enabling the primary and secondary images to be exposed onto different portions of the same frame area.

2. A camera construction according to claim 1, wherein the shutter release means enables the primary and secondary images to be exposed simultaneously onto different portions of the same frame area.

3. The camera construction according to claim 1, further including a shielding means for blocking light from the primary image from being focussed on the different portion of the same frame area on which the secondary image is focussed.

4. The camera construction according to claim 3, wherein the shielding means is juxtaposed close to the front surface of the film in order to block stray light from the primary image from being focussed on the different portion of the same frame area on which the secondary image is focussed.

5. The camera construction according to claim 3, wherein the shielding means is movable between a first position in which the shielding means blocks light from the primary image, and a second position in which the shielding means does not block light from the primary image.

6. The camera construction according to claim 3, wherein the shielding means is pivotally mounted within the camera construction, and is pivotable between a first position in which the shielding means blocks light from the primary image, and a second position in which the shielding means does not block light from the primary image.

7. The camera construction according to claims 5 or 6, wherein the shielding means automatically moves from the first position to the second position after activation of the shutter release means to expose the secondary image onto the different portion of the frame area.

8. The camera construction according to claims 5 or 6, wherein the rearwardly directed rear lens means further includes a secondary shutter coupled to the shielding means, such that the secondary shutter is cocked when the shielding means is moved into one of said first or second positions to the other of said first or second positions.

9. The camera construction according to claim 1, further including:
  a. a forwardly directed flash means for providing illumination on the primary object to be photographed;
  b. a rearwardly directed flash means for providing illumination on the secondary object to be photographed.

10. The camera construction according to claim 1, further including a mirror mounted on the back of the camera, and optically aligned with the rear lens, for viewing a secondary object to be photographed to confirm alignment of such object with the rear lens.

11. The camera construction according to claim 1, further including a viewfinder means for viewing the primary object to be photographed while distancing the camera construction from the secondary object to be photographed.

12. The camera construction according to claim 11, wherein the viewfinder means includes indicator means for showing the approximate location of the different portion of the frame area of the film where the second image is focussed.

13. A method for exposing photographic film for forming a primary image of a front object and a secondary image of a rear object on a single frame of film, comprising the steps of:
  a. using a camera having a forwardly directed primary image taking lens, a rearwardly directed secondary image taking lens, and shutter release means for enabling exposure of the primary and secondary images on a film within the camera having a photosensitive emulsion coated on a transparent base material;
  b. focussing the primary image of a front object through the primary image taking lens onto a first portion of the frame of film;
  c. focussing the secondary image of the rear object through the secondary image taking lens through the transparent base of the film onto a second portion of the same frame of film;
  d. activating the shutter release means to cause the primary and secondary images to be exposed onto the respective first and second portions of the same frame of film.

14. The method of claim 13, wherein the shutter release means enables the primary and secondary images to be exposed simultaneously onto the respective first and second portions of the same frame of film.

15. The method of claim 13, wherein the shutter release means enables the primary and secondary images to be exposed sequentially onto the respective first and second portions of the same frame of film.

* * * * *